(12) United States Patent
Ryhorski

(10) Patent No.: US 11,808,664 B1
(45) Date of Patent: Nov. 7, 2023

(54) MOISTURE-DETECTING WATER SOURCE SHUTOFF DEVICE

(71) Applicant: Corey Ryhorski, Saskatoon (CA)

(72) Inventor: Corey Ryhorski, Saskatoon (CA)

( * ) Notice: Subject to any disclaimer, the term of this patent is extended or adjusted under 35 U.S.C. 154(b) by 0 days.

(21) Appl. No.: 18/197,161

(22) Filed: May 15, 2023

(51) Int. Cl.
*G01M 3/16* (2006.01)
*A47L 15/42* (2006.01)
*E03B 7/07* (2006.01)

(52) U.S. Cl.
CPC ........... *G01M 3/16* (2013.01); *A47L 15/4212* (2013.01); *E03B 7/071* (2013.01); *Y10T 137/5762* (2015.04)

(58) Field of Classification Search
CPC ......... G01M 3/16; G01M 3/045; E03B 7/071; A47L 15/4212; A47L 15/421; D06F 39/081; F24H 15/12; Y10T 137/5762; Y02A 20/15
See application file for complete search history.

(56) References Cited

U.S. PATENT DOCUMENTS

| | | | | |
|---|---|---|---|---|
| 3,096,781 A | * | 7/1963 | Roidt | A47L 15/4251 220/571 |
| 3,304,950 A | * | 2/1967 | Hubert | D06F 39/081 312/229 |
| 4,903,723 A | * | 2/1990 | Sublett | A47L 15/421 4/251.1 |
| 5,437,303 A | * | 8/1995 | Johnson | D06F 39/081 4/251.1 |
| 5,452,739 A | * | 9/1995 | Mustee | A47L 15/4212 4/251.1 |
| 5,877,689 A | * | 3/1999 | D'Amico | F24H 15/395 73/317 |
| 5,881,762 A | * | 3/1999 | Janesky | F24H 9/17 220/571 |
| 5,883,300 A | * | 3/1999 | Johnson | B60R 5/04 73/40 |
| 5,918,617 A | * | 7/1999 | Garth | D06F 39/081 137/1 |

(Continued)

FOREIGN PATENT DOCUMENTS

| CN | 114705376 A | * | 7/2022 | |
|---|---|---|---|---|
| DE | 102009000211 B4 | * | 5/2019 | ........... A47L 15/421 |

(Continued)

*Primary Examiner* — David Colon-Morales
(74) *Attorney, Agent, or Firm* — Pharar Patents & Intellectual Property; Andrew A. Pharar

(57) ABSTRACT

The moisture-detecting water source shutoff device may allow a user to detect the intrusion of water into an interior space where it is not desired, contain the water intrusion, automatically shut off the supply of water to the affected area, and emit an audio or visual alarm to a user of the system. The moisture-detecting water source shutoff device may specifically comprise a drip tray that may contain the water intrusion and prevent damage to the surrounding area, a plurality of sensors within the drip tray to detect the water intrusion, a plurality of shutoff valves that may be closed by the sensors detecting an intrusion, and the ability of a user to manually start, stop, and reset the valves. The device may further comprise a mechanism that allows the user to drain the drip tray without removing the appliance, and a wireless connectivity to the user's smart phone and home security system.

4 Claims, 10 Drawing Sheets

(56) References Cited

U.S. PATENT DOCUMENTS

| | | | | |
|---|---|---|---|---|
| 5,934,302 | A * | 8/1999 | Nemelka | D06F 39/088 137/80 |
| 6,003,536 | A * | 12/1999 | Polverari | D06F 39/081 68/12.02 |
| 6,024,116 | A * | 2/2000 | Almberg | F16K 31/003 122/504 |
| 6,057,770 | A * | 5/2000 | Justesen | G01M 3/18 340/514 |
| 6,135,133 | A * | 10/2000 | Ridgeway, Jr. | G01M 3/02 220/571 |
| 6,810,902 | B2 * | 11/2004 | Bootka | E03D 11/00 4/395 |
| 6,860,288 | B2 * | 3/2005 | Uhler | G01M 3/2807 137/551 |
| 7,042,362 | B2 * | 5/2006 | Pai | G01M 3/04 110/193 |
| 7,082,959 | B1 * | 8/2006 | Franklin | F16K 17/383 251/74 |
| 7,124,772 | B1 * | 10/2006 | Browning | G08B 21/20 220/571 |
| 7,218,237 | B2 * | 5/2007 | Kates | G08B 21/20 340/573.6 |
| 7,363,936 | B1 * | 4/2008 | Simoneaux | E03C 1/186 4/251.1 |
| 7,489,253 | B2 * | 2/2009 | Murphy | G08B 21/20 340/602 |
| 8,430,115 | B2 * | 4/2013 | Stieb | F17D 5/06 137/391 |
| 8,590,559 | B1 * | 11/2013 | Gutierrez | G01M 3/16 200/61.04 |
| 8,643,497 | B2 * | 2/2014 | Murphy | F24H 9/17 340/602 |
| 8,776,824 | B2 * | 7/2014 | Yao | G01M 3/18 137/551 |
| 8,905,057 | B2 * | 12/2014 | Sass | A47L 15/4212 137/551 |
| 10,435,872 | B2 * | 10/2019 | Godager | D06F 33/47 |
| 10,612,217 | B2 * | 4/2020 | Evans | G05D 7/0635 |
| 11,313,751 | B1 * | 4/2022 | McGehee | G01M 3/16 |
| 11,401,650 | B2 * | 8/2022 | Lee | D06F 37/262 |
| 11,536,464 | B2 * | 12/2022 | Nolte | F24H 15/12 |
| 11,691,313 | B2 * | 7/2023 | Rikiishi | H01L 21/67017 438/460 |
| 2011/0315237 | A1 * | 12/2011 | Jenkins | A61M 1/16 137/312 |

FOREIGN PATENT DOCUMENTS

| | | | | |
|---|---|---|---|---|
| EP | 1210903 A2 * | 6/2002 | | A47L 15/4212 |
| GB | 2199436 A * | 7/1988 | | D06F 39/081 |
| GB | 2272553 A * | 5/1994 | | D06F 39/081 |

* cited by examiner ated with copyright protection. The
MOISTURE-DETECTING WATER SOURCE SHUTOFF DEVICE

TECHNICAL FIELD OF THE INVENTION

The present invention relates in general to moisture detection devices, and, more specifically, to a moisture-detecting water source shutoff device.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Water intrusion into a home or other interior space is a known and common problem resulting in extensive damage to the affected property and financial burden on the owner of such property. The intrusion of water may result from a number of various causes including, for example, leaking or burst pipes, leaking roof panels, or blocked pipes causing backflow of water into the interior space. A common source of water intrusion, especially from leaking or blocked pipes, may be a plurality of appliances and fixtures such as, for example, washing machines, dishwashers, and water heaters. Because the causes of water intrusion may be so varied, there exist many different devices for in-home water intrusion detection.

One such device for water intrusion detection may be attached directly to an inlet water pipe for detecting an abnormal increase in the flow of water through the pipe. Such a device may comprise a probe for measuring water volume or velocity and a hardware or software interface for interpreting such measures. The hardware or software interface may be physically attached to the probe or may be wirelessly connected for remote viewing, may activate a warning indicator to visually notify a user of the abnormal water flow, and/or may activate a shutoff valve to stop the flow of water through the pipe. Such a design, though, is prone to false positive alerts, as the increased flow of water may be the result of an increased but normal demand for water from the pipe. Such a design also may not actually detect water intrusion as the test relies on a measure of water volume or velocity past the probe, and the leak may be upstream of the probe, resulting in a low or absent measure, or may be slow enough that it does not trigger an abnormal reading on the probe itself. Such a device may be known as a "FloLogic" system or a "Leak Defense" system.

Another such device for water intrusion detection may comprise a sensor string network for detecting abnormal water volume in various interior spaces. Such a device may comprise a sonar and radar technology for detecting changes in impedance across a sensor cable and visually displaying such changes on a remote panel. By its nature such a design is limited to smaller or enclosed spaces such as tanks, sumps, or other low points where water intrusion may result in pooling of such water, and is generally not efficient to use in large or open areas. Such a device may be known as a "PermAlert" system or a "SeaHawk" system.

Another such device for water intrusion detection may comprise a humidity sensor for detecting an abnormal increase in water content in an interior space. Such a device may comprise a humidity sensor and an alarm-emitting speaker or other audible notification means. Such a design may accurately detect a water leak, though may not generate an adequate response to such a leak as the user must be within audible range of the alarm to be notified of such leak. The resulting delay in responding to a water leak cause by such a notification system may result in an increase in damage caused by such water leak. Such a device may be known as a "Wally Water Leak Detection" system or a "Saber Water Leak Alarm" system.

The plurality of devices and systems currently available on the market may further comprise single devices that do not include deployable moisture collection systems to cover an appropriate area, and may not comprise a device that provides internal monitoring, relay to a computer system, wireless connectivity, instant notification of alerts, and a water containment system.

Thus, there is a need in the art for a moisture-detecting water source shutoff device that may allow a user to detect the intrusion of water into an interior space where it is not desired, contain the water intrusion, automatically shut off the supply of water to the affected area, and emit an audio or visual alarm to a user of the system. The moisture-detecting water source shutoff device may specifically comprise a drip tray that may contain the water intrusion and prevent damage to the surrounding area, a plurality of sensors within the drip tray to detect the water intrusion, a plurality of shutoff valves that may be closed by the sensors detecting an intrusion, and the ability of a user to manually start, stop, and reset the valves. The device may further comprise a mechanism that allows the user to drain the drip tray without removing the appliance, and a wireless connectivity to the user's smart phone and home security system. It is to these ends that the present invention has been developed.

BRIEF SUMMARY OF THE INVENTION

To minimize the limitations in the prior art, and to minimize other limitations that will be apparent upon reading and understanding the present specification, the present invention describes a moisture-detecting water source shutoff device.

It is an objective of the present invention to provide a moisture-detecting water source shutoff device that may comprise a drip tray.

It is another objective of the present invention to provide a moisture-detecting water source shutoff device that may comprise a control panel.

It is another objective of the present invention to provide a moisture-detecting water source shutoff device that may comprise an on/off switch.

It is another objective of the present invention to provide a moisture-detecting water source shutoff device that may comprise a reset switch.

It is another objective of the present invention to provide a moisture-detecting water source shutoff device that may comprise a plurality of indicators.

It is another objective of the present invention to provide a moisture-detecting water source shutoff device that may comprise a vacuum port.

It is another objective of the present invention to provide a moisture-detecting water source shutoff device that may comprise a vacuum port cover.

It is another objective of the present invention to provide a moisture-detecting water source shutoff device that may comprise a plurality of water sensors.

It is another objective of the present invention to provide a moisture-detecting water source shutoff device that may comprise a slanted floor.

It is another objective of the present invention to provide a moisture-detecting water source shutoff device that may comprise a plurality of magnets.

It is another objective of the present invention to provide a moisture-detecting water source shutoff device that may comprise a standard tray.

It is another objective of the present invention to provide a moisture-detecting water source shutoff device that may comprise a dishwasher tray.

It is another objective of the present invention to provide a moisture-detecting water source shutoff device that may comprise a water heater tray.

It is another objective of the present invention to provide a moisture-detecting water source shutoff device that may comprise a refrigerator tray.

It is another objective of the present invention to provide a moisture-detecting water source shutoff device that may comprise a plurality of shutoff valves.

It is another objective of the present invention to provide a moisture-detecting water source shutoff device that may comprise an alarm.

It is another objective of the present invention to provide a moisture-detecting water source shutoff device that may comprise a wireless remote.

It is another objective of the present invention to provide a moisture-detecting water source shutoff device that may comprise a wireless remote receiver.

It is another objective of the present invention to provide a moisture-detecting water source shutoff device that may comprise a software application.

It is another objective of the present invention to provide a moisture-detecting water source shutoff device that may comprise a resilient material of construction.

It is another objective of the present invention to provide a moisture-detecting water source shutoff device that may comprise a water-proof material of construction.

It is another objective of the present invention to provide a moisture-detecting water source shutoff device that may comprise a reusable material of construction.

It is another objective of the present invention to provide a moisture-detecting water source shutoff device that may comprise a washable material of construction.

It is another objective of the present invention to provide a moisture-detecting water source shutoff device that may comprise a multi-component construction.

It is another objective of the present invention to provide a moisture-detecting water source shutoff device that may comprise an antimicrobial layer.

It is another objective of the present invention to provide a moisture-detecting water source shutoff device that may comprise an antimicrobial material of construction.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

DETAILED DESCRIPTION OF THE INVENTION

Certain terminology is used in the following description for reference only and is not limiting. The words "front," "rear," "anterior," "posterior," "lateral," "medial," "upper," "lower," "outer," "inner," and "interior" refer to directions toward and away from, respectively, the geometric center of the invention, and designated parts thereof, in accordance with the present disclosure. Unless specifically set forth herein, the terms "a," "an," and "the" are not limited to one element, but instead should be read as meaning "at least one." The terminology includes the words noted above, derivatives thereof, and words of similar import.

The moisture-detecting water source shutoff device may allow a user to detect the intrusion of water into an interior space where it is not desired, contain the water intrusion, automatically shut off the supply of water to the affected area, and emit an audio or visual alarm to a user of the system. The moisture-detecting water source shutoff device may specifically comprise a drip tray that may contain the water intrusion and prevent damage to the surrounding area, a plurality of sensors within the drip tray to detect the water intrusion, a plurality of shutoff valves that may be closed by the sensors detecting an intrusion, and the ability of a user to manually start, stop, and reset the valves. The device may further comprise a mechanism that allows the user to drain the drip tray without removing the appliance, and a wireless connectivity to the user's smart phone and home security system.

Figure 1:
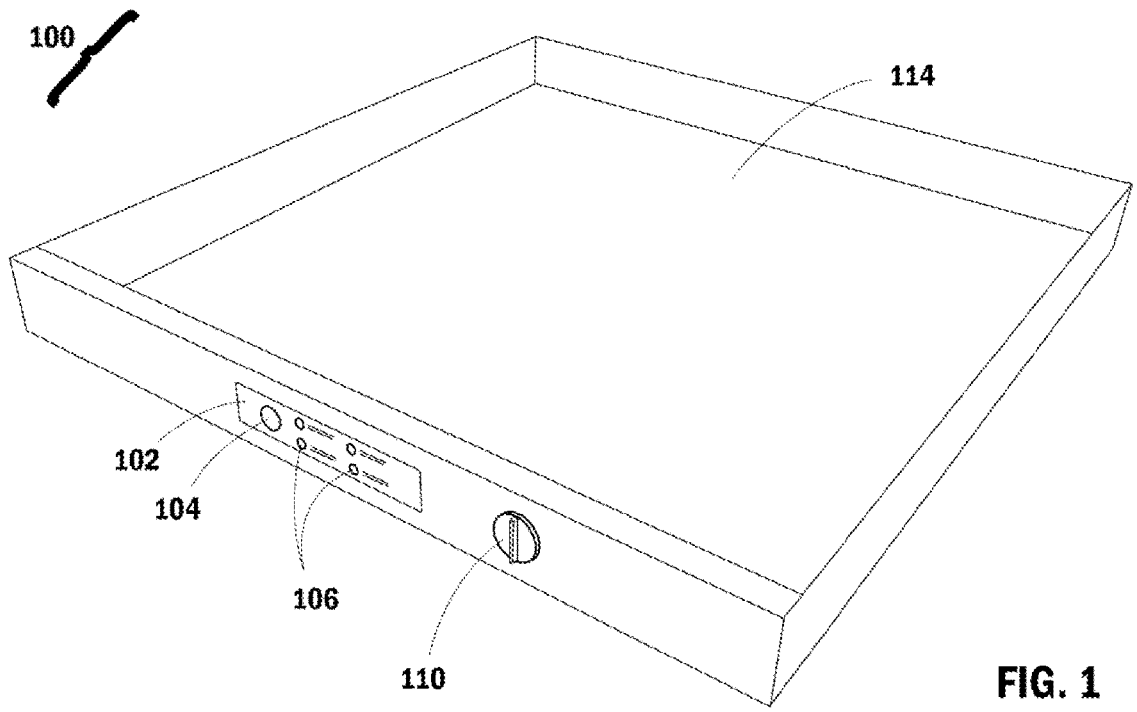
FIG. 1 is a front isometric perspective view of a first embodiment of a moisture-detecting water source shutoff device, as contemplated by the present disclosure.
Figure 2:
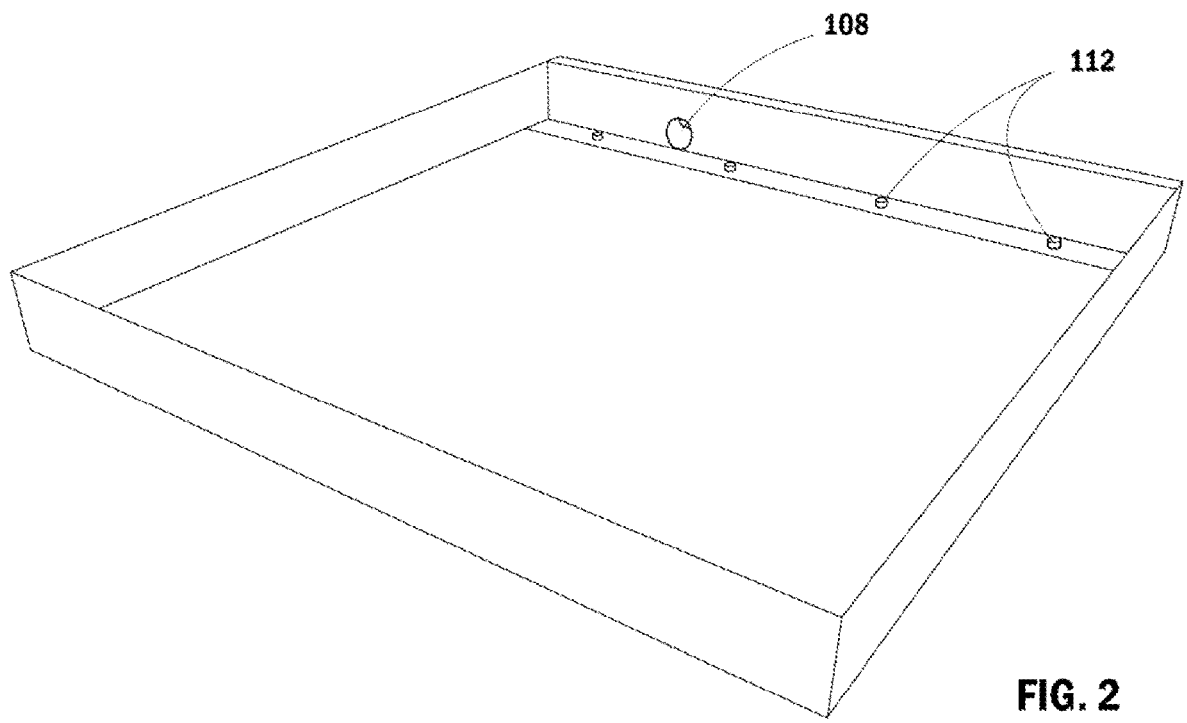
FIG. 2 is a rear isometric perspective view of a first embodiment of a moisture-detecting water source shutoff device, as contemplated by the present disclosure.
Figure 3:
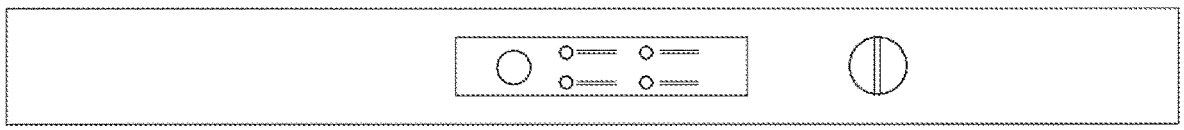
FIG. 3 is a front elevation view of a first embodiment of a moisture-detecting water source shutoff device, as contemplated by the present disclosure.
Figure 4:
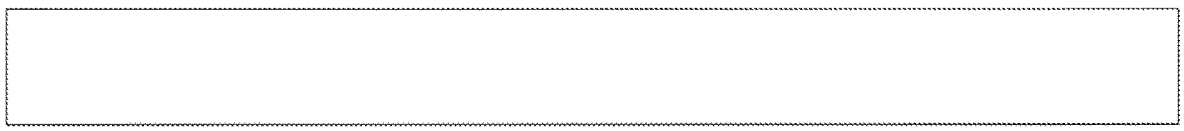
FIG. 4 is a rear elevation view of a first embodiment of a moisture-detecting water source shutoff device, as contemplated by the present disclosure.
Figure 5:
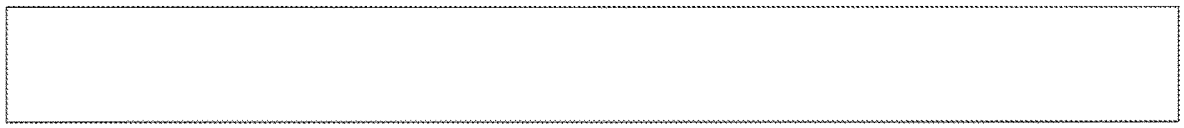
FIG. 5 is a left side elevation view of a first embodiment of a moisture-detecting water source shutoff device, as contemplated by the present disclosure.
Figure 6:
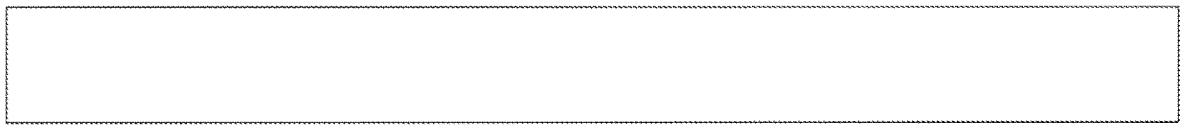
FIG. 6 is a right side elevation view of a first embodiment of a moisture-detecting water source shutoff device, as contemplated by the present disclosure.
Figure 7:
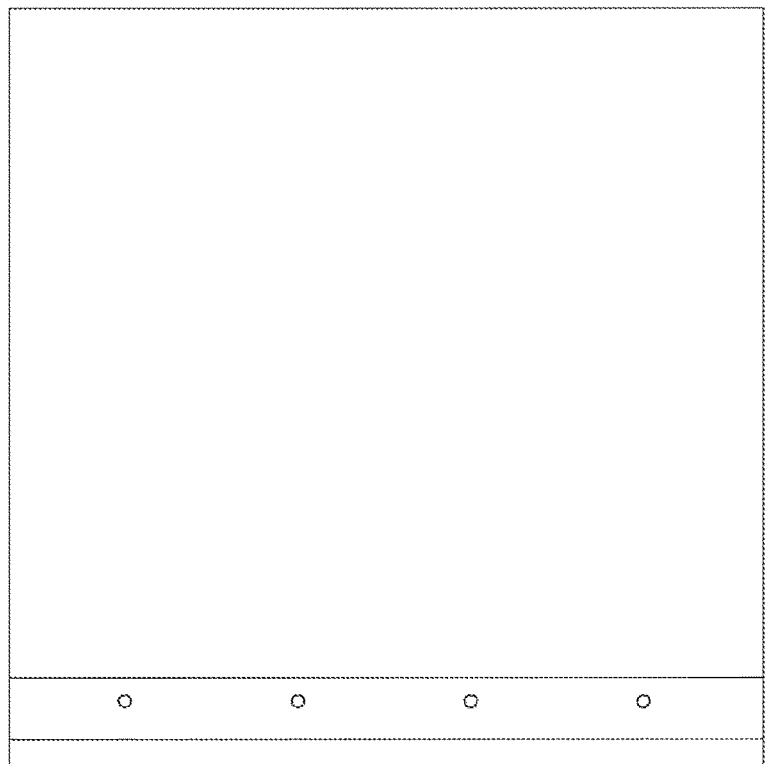
FIG. 7 is a top elevation view of a first embodiment of a moisture-detecting water source shutoff device, as contemplated by the present disclosure.
Figure 8:
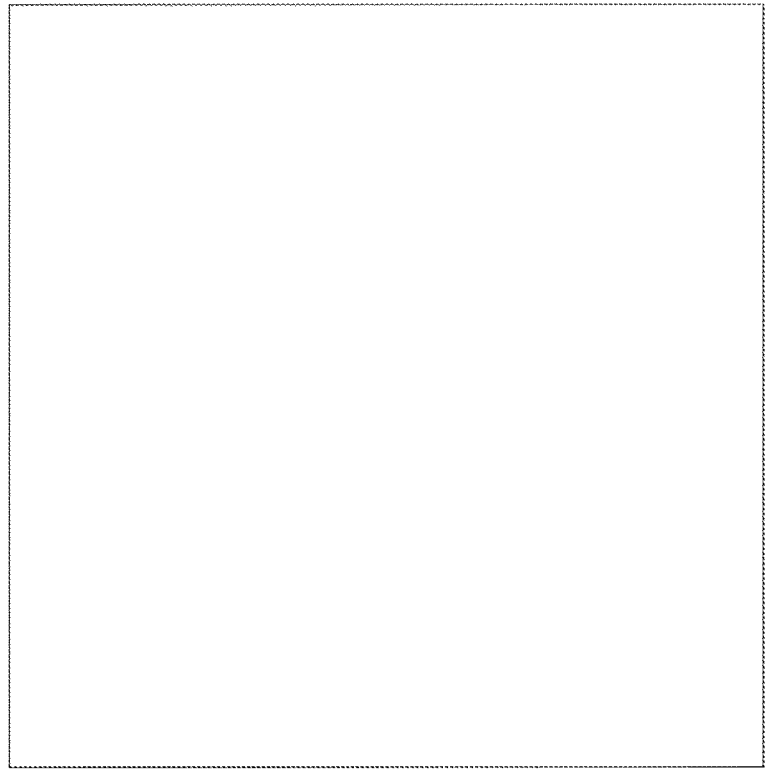
FIG. 8 is a bottom elevation view of a first embodiment of a moisture-detecting water source shutoff device, as contemplated by the present disclosure.
Figure 9:
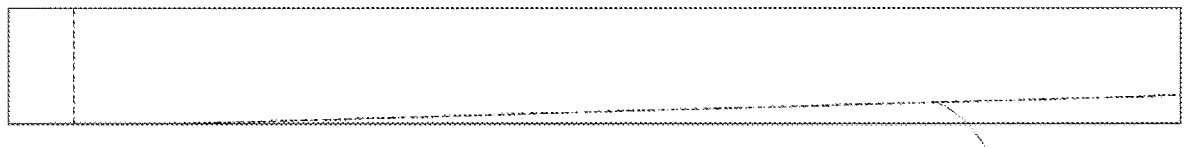
FIG. 9 is a left side cross-sectional view of a first embodiment of a moisture-detecting water source shutoff device, as contemplated by the present disclosure.
Figure 10:
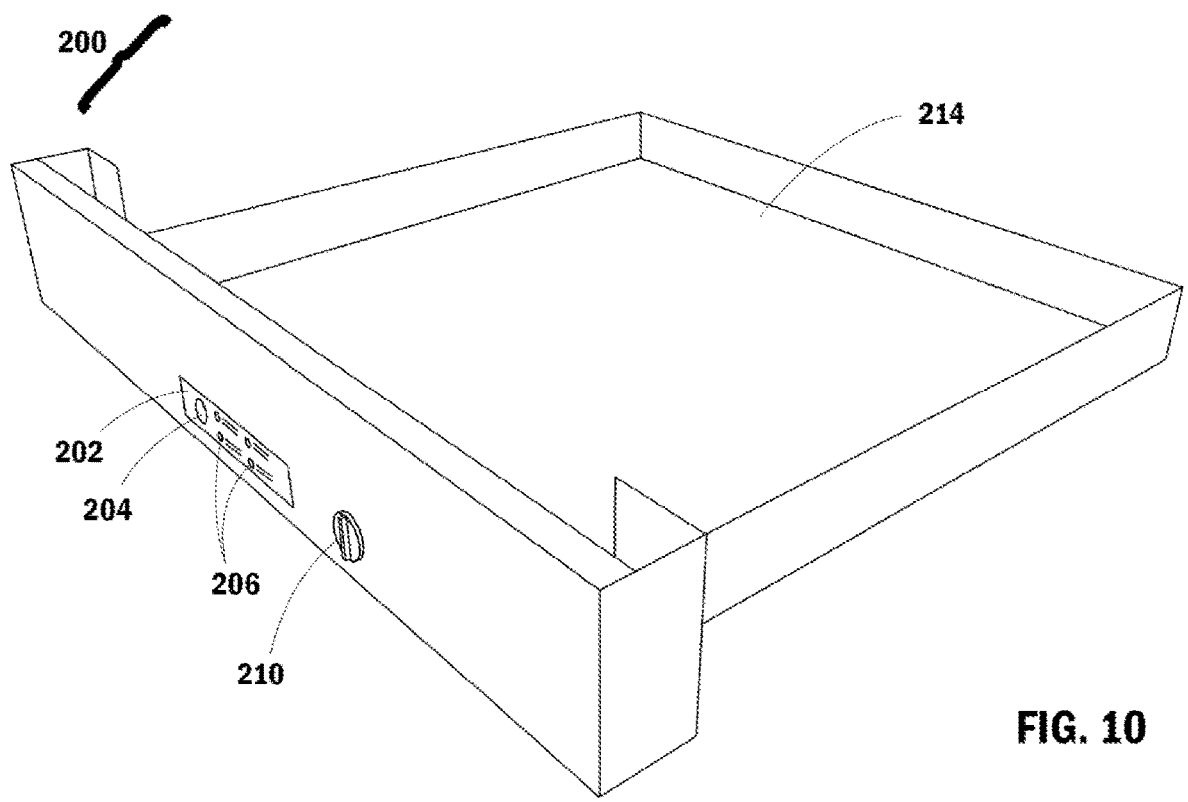
FIG. 10 is a front isometric perspective view of a second embodiment of a moisture-detecting water source shutoff device, as contemplated by the present disclosure.
Figure 11:
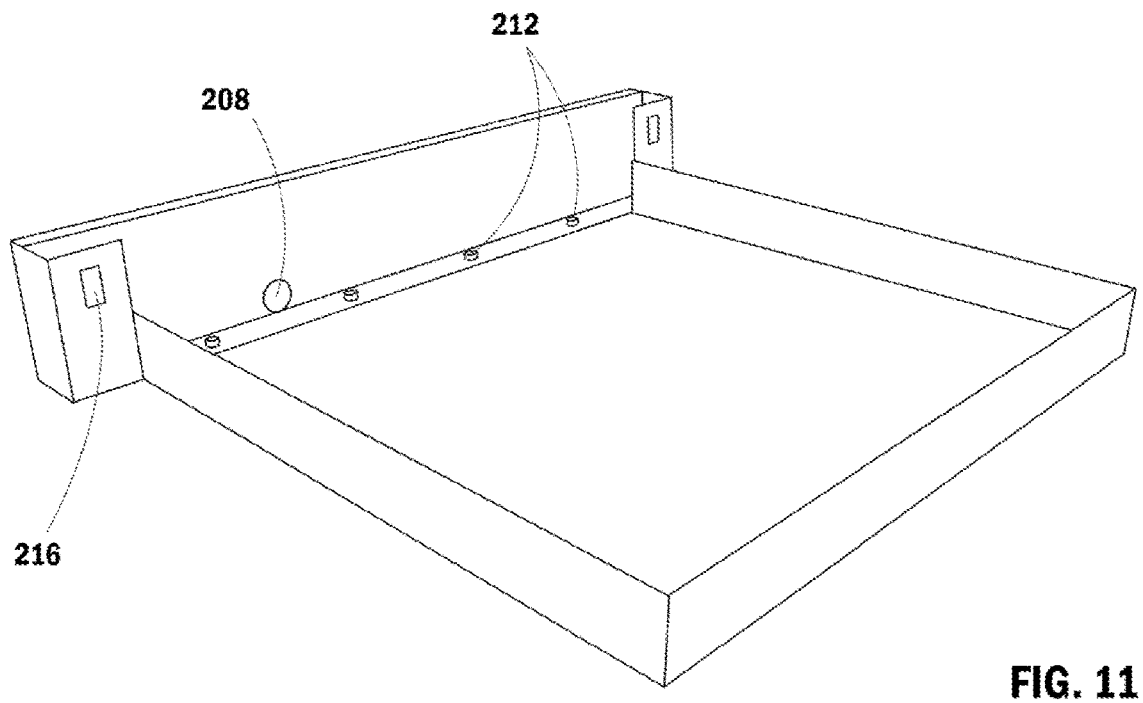
FIG. 11 is a rear isometric perspective view of a second embodiment of a moisture-detecting water source shutoff device, as contemplated by the present disclosure.
Figure 12:
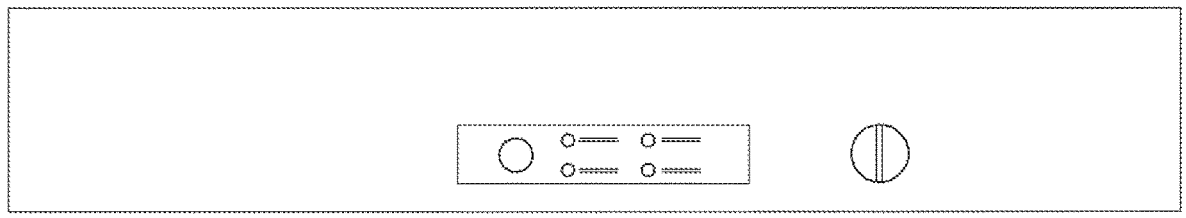
FIG. 12 is a front elevation view of a second embodiment of a moisture-detecting water source shutoff device, as contemplated by the present disclosure.
Figure 13:
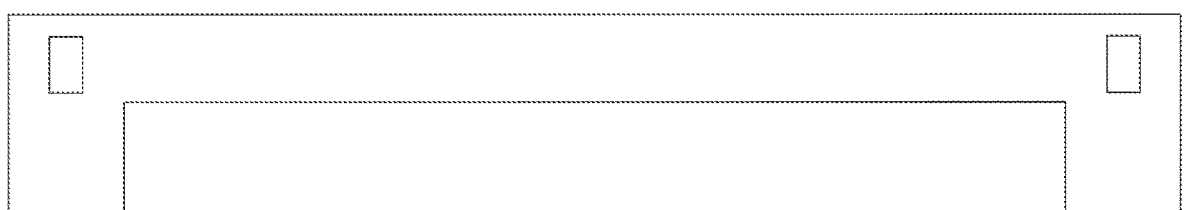
FIG. 13 is a rear elevation view of a second embodiment of a moisture-detecting water source shutoff device, as contemplated by the present disclosure.
Figure 14:
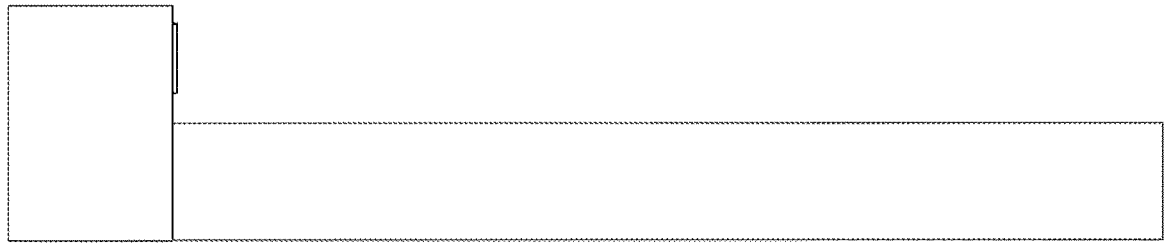
FIG. 14 is a left side elevation view of a second embodiment of a moisture-detecting water source shutoff device, as contemplated by the present disclosure.
Figure 15:
FIG. 15 is a right side elevation view of a second embodiment of a moisture-detecting water source shutoff device, as contemplated by the present disclosure.
Figure 16:
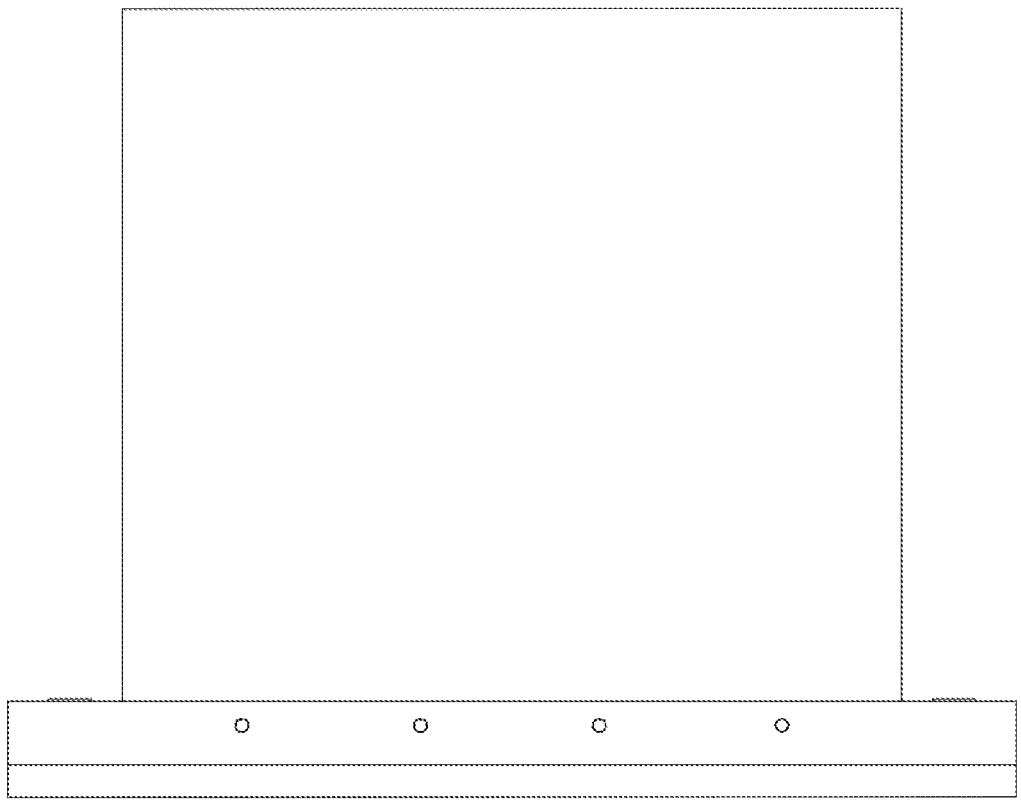
FIG. 16 is a top elevation view of a second embodiment of a moisture-detecting water source shutoff device, as contemplated by the present disclosure.
Figure 17:
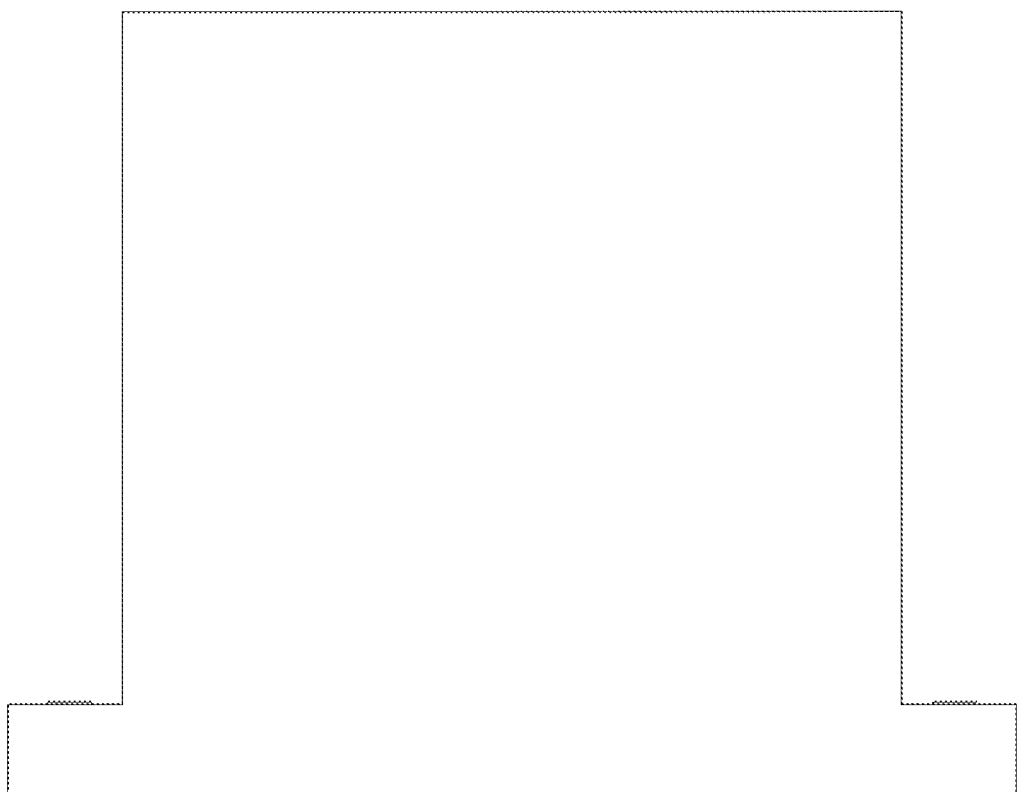
FIG. 17 is a bottom elevation view of a second embodiment of a moisture-detecting water source shutoff device, as contemplated by the present disclosure.
Figure 18:
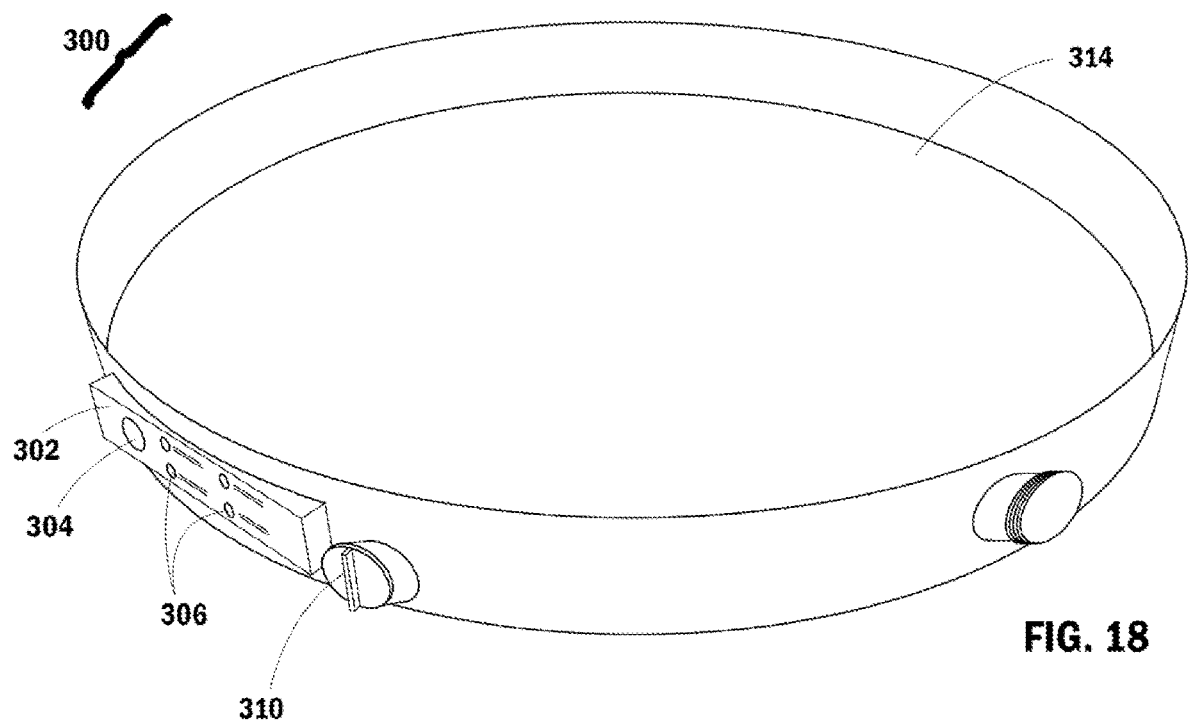
FIG. 18 is a front isometric perspective view of a third embodiment of a moisture-detecting water source shutoff device, as contemplated by the present disclosure.
Figure 19:
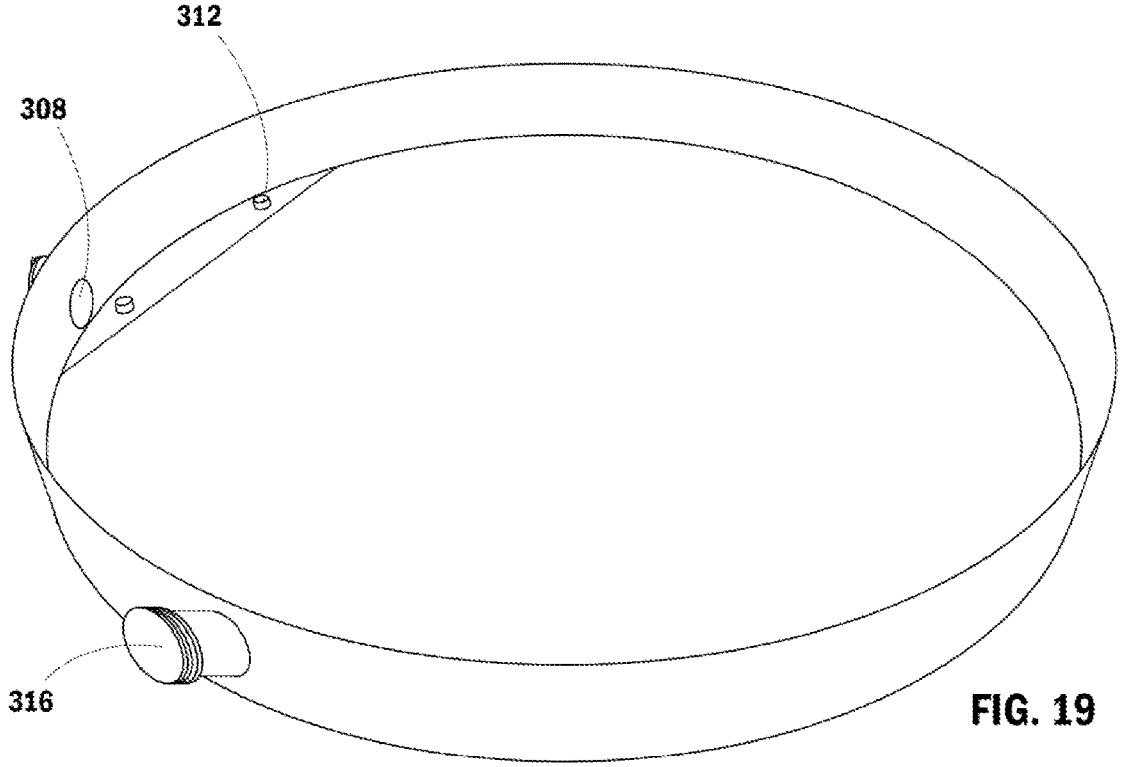
FIG. 19 is a rear isometric perspective view of a third embodiment of a moisture-detecting water source shutoff device, as contemplated by the present disclosure.
Figure 20:
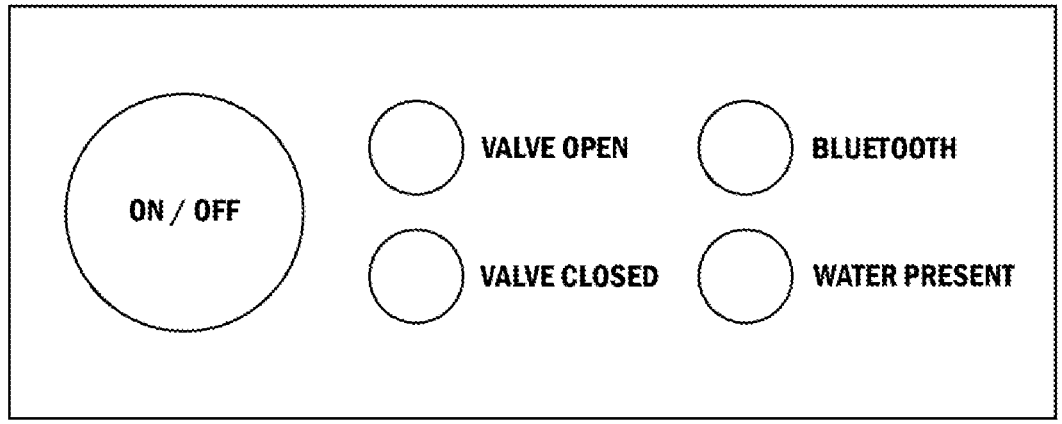
FIG. 20 is an overall view of a control panel of a moisture-detecting water source shutoff device, as contemplated by the present disclosure.
Figure 21:
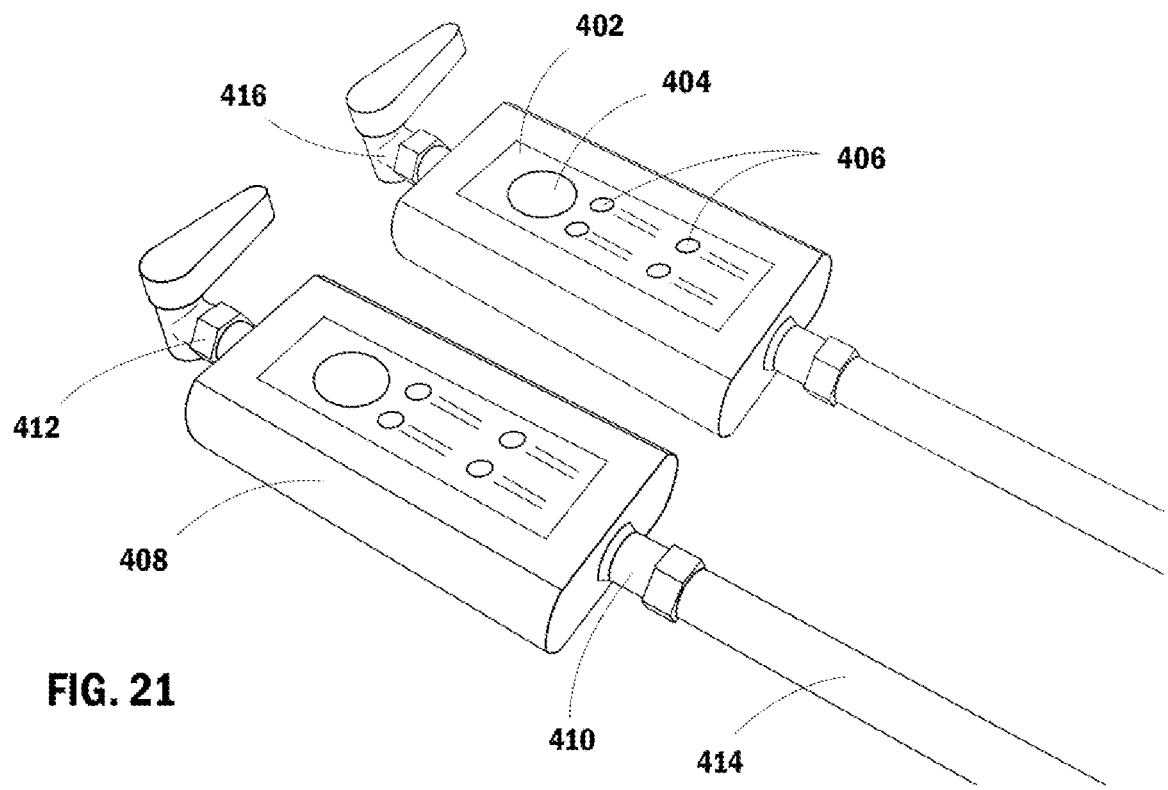
FIG. 21 is an overall view of a plurality of shutoff valves of a moisture-detecting water source shutoff device, as contemplated by the present disclosure.

The illustrations of FIGS. 1-21 illustrate a moisture-detecting water source shutoff device, as contemplated by the present disclosure. The device may comprise, generally, a main body comprising a control panel, a vacuum port, a plurality of sensors, and a plurality of shutoff valves.

In a first embodiment the main body 100 may comprise, generally, a drip tray having a front side, a rear side, a left side, a right side, a bottom side, and a central cavity. The various sides may comprise a substantially rectangular or square shape into which may be placed a suitable appliance such as, for example, a washing machine or a refrigerator. The sides may be tall enough to cover a bottom portion of the appliance and create a water-retaining area while still allowing the appliance to function as intended. The sides may also be smooth to allow for easy sliding of the appliance.

The front side of the main body 100 may further comprise a control panel 102. The control panel 102 may further comprise a reset switch 104 and a plurality of indicators 106. The reset switch 104 may comprise any appropriate switch such as, for example, a single pole single throw switch, a momentary switch, or a maintained switch. The plurality of indicators 106 may comprise any appropriate indicators such as, for example, light bulbs or light-emitting diodes. The control panel 102 may further comprise a control module to which the reset switch 104 and the plurality of indicators 106 are electrically attached. The reset switch 104 may allow a user of the moisture-detecting water source shutoff device to turn on, turn off, or reset power to the device. The plurality of indicators may indicate to said user various status elements of the device such as, for example, whether the device is on or off, whether the control panel 102 is wirelessly connected to a plurality of shutoff valves 408, and whether or not water is detected within the device.

The front side of the main body 100 may further comprise a vacuum port 108, which may comprise an opening through the front side of the main body 100 to which a vacuum source may be attached. The vacuum port 108 may be configured such that a bottom edge of the vacuum port 108 is contiguous with the bottom surface of the main body 100. In this way a user may apply a vacuum source to the vacuum port 108 and remove any water contained within the main body 100. The vacuum port 108 may further comprise a port cover 110, which may be any cover reversibly attached to the vacuum port 108 appropriate to seal the vacuum port 108 when desired.

The main body 100 may further comprise a plurality of water sensors 112, which may comprise any sensors appropriate for detecting the presence of water or moisture within the main body 100. The plurality of water sensors 112 may be attached to the bottom surface of the main body 100 and may be electronically or wirelessly attached to the control module of the control panel 102. The bottom surface of the main body 100 may further comprise a slanted floor 114, which may be a planar surface angled towards the plurality of water sensors 112. By this mechanism any water in the main body 100 may be directed towards the water sensors 112, which then alert the control module of the control panel 102 to the presence of the water.

In a second embodiment the main body 200 may comprise, generally, a drip tray having a front side, a rear side, a left side, a right side, a bottom side, and a central cavity. The various sides may comprise a substantially rectangular or square shape having additional width near the front side of the device into which may be placed a suitable appliance such as, for example, a dishwasher. The additional width projections may further comprise a plurality of magnets 216, which may facilitate magnetic attachment of the device to the appliance. The sides may be tall enough to cover a bottom portion of the appliance and create a water-retaining area while still allowing the appliance to function as intended. The sides may also be smooth to allow for easy sliding of the appliance.

The front side of the main body 200 may further comprise a control panel 202. The control panel 202 may further comprise a reset switch 204 and a plurality of indicators 206. The reset switch 204 may comprise any appropriate switch such as, for example, a single pole single throw switch, a momentary switch, or a maintained switch. The plurality of indicators 206 may comprise any appropriate indicators such as, for example, light bulbs or light-emitting diodes. The control panel 202 may further comprise a control module to which the reset switch 204 and the plurality of indicators 206 are electrically attached. The reset switch 204 may allow a user of the moisture-detecting water source shutoff device to turn on, turn off, or reset power to the device. The plurality of indicators may indicate to said user various status elements of the device such as, for example, whether the device is on or off, whether the control panel 202 is wirelessly connected to a plurality of shutoff valves 408, and whether or not water is detected within the device.

The front side of the main body 200 may further comprise a vacuum port 208, which may comprise an opening through the front side of the main body 200 to which a vacuum source may be attached. The vacuum port 208 may be configured such that a bottom edge of the vacuum port 208 is contiguous with the bottom surface of the main body 200.

In this way a user may apply a vacuum source to the vacuum port 208 and remove any water contained within the main body 200. The vacuum port 208 may further comprise a port cover 210, which may be any cover reversibly attached to the vacuum port 208 appropriate to seal the vacuum port 208 when desired.

The main body 200 may further comprise a plurality of water sensors 212, which may comprise any sensors appropriate for detecting the presence of water or moisture within the main body 200. The plurality of water sensors 212 may be attached to the bottom surface of the main body 200 and may be electronically or wirelessly attached to the control module of the control panel 202. The bottom surface of the main body 200 may further comprise a slanted floor 214, which may be a planar surface angled towards the plurality of water sensors 212. By this mechanism any water in the main body 200 may be directed towards the water sensors 212, which then alert the control module of the control panel 202 to the presence of the water.

In a third embodiment the main body 300 may comprise, generally, a drip tray having front side, a rear side, a left side, a right side, a bottom side, and a central cavity. The various sides may comprise a substantially circular shape into which may be placed a suitable appliance such as, for example, a water heater. The sides may be tall enough to cover a bottom portion of the appliance and create a water-retaining area while still allowing the appliance to function as intended. The sides may also be smooth to allow for easy sliding of the appliance.

The front side of the main body 300 may further comprise a control panel 302. The control panel 302 may further comprise a reset switch 304 and a plurality of indicators 306. The reset switch 304 may comprise any appropriate switch such as, for example, a single pole single throw switch, a momentary switch, or a maintained switch. The plurality of indicators 306 may comprise any appropriate indicators such as, for example, light bulbs or light-emitting diodes. The control panel 302 may further comprise a control module to which the reset switch 104 and the plurality of indicators 306 are electrically attached. The reset switch 304 may allow a user of the moisture-detecting water source shutoff device to turn on, turn off, or reset power to the device. The plurality of indicators may indicate to said user various status elements of the device such as, for example, whether the device is on or off, whether the control panel 302 is wirelessly connected to a plurality of shutoff valves 408, and whether or not water is detected within the device.

The front side of the main body 300 may further comprise a vacuum port 308, which may comprise an opening through the front side of the main body 300 to which a vacuum source may be attached. The vacuum port 308 may be configured such that a bottom edge of the vacuum port 308 is contiguous with the bottom surface of the main body 300. In this way a user may apply a vacuum source to the vacuum port 308 and remove any water contained within the main body 300. The vacuum port 308 may further comprise a port cover 310, which may be any cover reversibly attached to the vacuum port 308 appropriate to seal the vacuum port 308 when desired.

The main body 300 may further comprise a plurality of water sensors 312, which may comprise any sensors appropriate for detecting the presence of water or moisture within the main body 300. The plurality of water sensors 312 may be attached to the bottom surface of the main body 300 and may be electronically or wirelessly attached to the control module of the control panel 302. The bottom surface of the main body 300 may further comprise a slanted floor 314, which may be a planar surface angled towards the plurality of water sensors 312. By this mechanism any water in the main body 300 may be directed towards the water sensors 312, which then alert the control module of the control panel 302 to the presence of the water.

The main body 300 may further comprise an overflow outlet 316, which may be an outlet that allows for the overflow of water when the capacity of water leaking from an appliance may exceed the capacity of the main body 300. The overflow outlet 316 may comprise, generally, any port or conduit further comprising a threaded section suitable for receiving a standard hose or pipe. The standard hose or pipe may be attached to the overflow outlet 316 and may lead to or be attached to an existing water or sewer drain near the appliance. Where the vacuum port 308 may be configured such that a bottom edge of the vacuum port 308 is contiguous with the bottom surface of the main body 300 the overflow outlet 316 may be configured such that a bottom edge of the overflow outlet 316 is above the bottom surface of the main body 300. In this way some water may be retained within the main body 300 so that the plurality of sensors 312 are triggered, but that water in excess of the capacity of the main body 300 is drained to a suitable location to prevent water damage to the surrounding area.

The plurality of shutoff valves 408 may comprise flow control valves each having a female connector 412 and a male connector 410 suitable for placing them inline between a water supply valve 416 and a water supply hose 414 for a particular appliance. The plurality of shutoff valves 408 may further comprise a panel 402, having a reset switch 404 and a plurality of indicators 406, and a control module having wireless connectivity. Internally the plurality of shutoff valves 408 may comprise a fluid flow pipe continuous with the female connector 412 and the male connector 414 and a shutoff valve suitable for stopping the flow of water through the shutoff valve 408.

In any embodiment the control module of the main body may be electrically connected to the reset switch and plurality of indicators of the embodiment, may be electrically or wirelessly connected to the plurality of sensors of the embodiment, and may be wirelessly connected to the plurality of shutoff valves 408 of the embodiment.

The panel of the main body may further comprise an alarm, which may comprise any appropriate audible or visual alert sufficient to informing a user that water has been detected within the main body. The panel of the shutoff valve may further comprise an alarm, which may comprise any appropriate audible or visual alert sufficient to informing a user that the shutoff valve has been closed and is not allowing water to flow. The objective of the alarm is to alert a user that the moisture-detecting water source shutoff device has detected water within the main body and automatically shut off the flow of water to the appliance.

The appropriate audible or visual alert of the alarm may comprise any appropriate mechanism for notification such as, for example, projecting an audible sound, displaying a visible notification, or sending a notification through an appropriate software. In one embodiment the audible sound may be projected by the addition of one or more speakers built into the various panels, which may project an alert when the alarm is triggered. In one embodiment the visual notification may be projected by the addition of one or more light bulbs or light-emitting diodes built into the various panels, which may display an alert when the alarm is triggered.

In one embodiment the moisture-detecting water source shutoff device may further comprise a control module, which may itself comprise a battery, a capacitor, and other electronic components appropriate to obtaining the objective of the control module. The control module may store and provide electrical power to the device and may receive a plurality of signals from a software application. In one embodiment the control module may be wirelessly connected to a software application by a wireless receiver. The software application may provide a user with the ability to wirelessly control the various panels of the device. In one embodiment the moisture-detecting water source shutoff device may further comprise a software application that allows the user to control, monitor, and receive alerts from the moisture-detecting water source shutoff device. The software application may further allow the user to integrate the device with the user's home security system or smart home system.

To begin using the device a user may first install one or more of the plurality of shutoff valves inline between a supply valve and a supply hose of an appliance. The user may then place the appliance within a main body of the device, and may operate the appliance as usual. If water leaks from the appliance it will be collected in the central cavity of the main body of the device. The slanted floor of the main body may direct the water towards the plurality of sensors of the device. When the water is detected by the plurality of sensors a signal may be transmitted to the panel of the device, which may then transmit a signal to the plurality of shutoff valves and stop the flow of water to the appliance.

The device may then provide an audible or visual alert to the user or may send an alert to the software application in a user's smart device. The user may remove the port cover of the device and vacuum the water out through the vacuum port, and may exact repairs to the appliance as needed to stop the leaking of water. Once repaired, the user may then reset the various panels of the device or may command a reset of the device through the software application and resume normal functioning of the moisture-detecting water source shutoff device and the connected appliance.

The moisture-detecting water source shutoff device may be substantially constructed of any suitable material or combination of materials, but typically is constructed of a resilient material or combination of materials such that the device is resistant to damage as a result of compression, twisting, heating, or submersion in water. As an example, and without limiting the scope of the present invention, various exemplary embodiments of the moisture-detecting water source shutoff device may be substantially constructed of one or more materials of steel, aluminum, brass, fiberglass, carbon fiber, plastic, acrylic, polycarbonate, polyester, nylon, denim, cotton, silicone, or combinations thereof. In some embodiments the various components of the device may be coated, lined, or otherwise insulated to prevent contamination of the device. In one embodiment the material of construction may vary from one component to the next within the system.

In one embodiment the moisture-detecting water source shutoff device may comprise a resilient material of construction that either comprises a material having antimicrobial properties or comprises a layering of antimicrobial material or coating. Antimicrobial properties comprise the characteristic of being antibacterial, biocidal, microbicidal, anti-fungal, anti-viral, or other similar characteristics, and the oligodynamic effect, which is possessed by copper, brass, silver, gold, and several other metals and alloys, is one such characteristic. Copper and its alloys, in particular, have exceptional self-sanitizing effects. Silver also has this effect, and is less toxic to users than copper. Some materials, such as silver in its metallic form, may require the presence of moisture to activate the antimicrobial properties.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

I claim:

1. A moisture-detecting water source shutoff device, comprising:
    a main body;
    a plurality of water sensors;
    a main body panel;
    a vacuum port; and
    a plurality of shutoff valves;
    wherein said main body further comprises a front side, a rear side, a left side, a right side, a bottom side, and a central cavity;
    wherein said bottom side of said main body further comprises a slanted floor;
    wherein said plurality of water sensors are installed within said central cavity of said main body;
    wherein said main body panel further comprises a reset switch and a plurality of indicators;
    wherein said main body panel is attached to said front side of said main body;
    wherein said main body panel is wirelessly connected to said plurality of water sensors;
    wherein said main body panel is wirelessly connected to said plurality of shutoff valves;
    wherein said main body panel receives an input from said plurality of water sensors;
    wherein said main body panel sends an output to said plurality of shutoff valves;
    wherein said vacuum port passes through said front side of said main body; and
    wherein each one of said plurality of shutoff valves is installed inline between a supply valve and a supply line of an appliance.

2. The shutoff device of claim 1, further comprising:
    a plurality of shutoff valve panels;
    wherein each one of said plurality of shutoff valve panels further comprises a reset switch and a plurality of indicators;
    wherein each one of said plurality of shutoff valve panels is attached to one each of said shutoff valves.

3. The shutoff device of claim 2, further comprising:
    an overflow outlet;
    wherein said overflow outlet passes through said main body; and
    wherein a bottom edge of said overflow outlet passes through said main body higher than a bottom edge of said vacuum port.

4. The shutoff device of claim 3, further comprising:
    a port cover;
    wherein said port cover is removably attached to said vacuum port.

* * * * *